United States Patent
Misawa et al.

(10) Patent No.: US 7,248,291 B2
(45) Date of Patent: Jul. 24, 2007

(54) DIGITAL CAMERA WITH PRIORITY INFORMATION

(75) Inventors: Atsushi Misawa, Asaka (JP); Yasunobu Kayanuma, Asaka (JP)

(73) Assignee: Fujifilm Corporation, Tokyo (JP)

( * ) Notice: Subject to any disclaimer, the term of this patent is extended or adjusted under 35 U.S.C. 154(b) by 819 days.

(21) Appl. No.: 10/078,384

(22) Filed: Feb. 21, 2002

(65) Prior Publication Data

US 2002/0118285 A1    Aug. 29, 2002

(30) Foreign Application Priority Data

Feb. 28, 2001    (JP)    ............... 2001-054965

(51) Int. Cl.
  *H04N 9/73*    (2006.01)
  *G06K 9/54*    (2006.01)
(52) U.S. Cl. ............... 348/231.2; 348/231.9; 382/305
(58) Field of Classification Search ............ 348/231.1, 348/164, 231.3, 231.2, 231.9; 382/305
  See application file for complete search history.

(56) References Cited

U.S. PATENT DOCUMENTS

| | | | |
|---|---|---|---|
| 5,146,592 A * | 9/1992 | Pfeiffer et al. | 715/807 |
| 5,845,166 A * | 12/1998 | Fellegara et al. | 396/429 |
| 6,477,332 B1 * | 11/2002 | Ohsawa | 396/319 |
| 6,608,650 B1 * | 8/2003 | Torres et al. | 348/333.02 |
| 6,834,130 B1 * | 12/2004 | Niikawa et al. | 382/305 |
| 2001/0050875 A1 * | 12/2001 | Kahn et al. | 365/229 |
| 2002/0063901 A1 * | 5/2002 | Hicks | 358/302 |

FOREIGN PATENT DOCUMENTS

| | | |
|---|---|---|
| JP | 10-79914 | 3/1998 |
| JP | 11-187347 | 7/1999 |
| JP | 2000-125185 | 4/2000 |
| JP | 2000-244790 | 9/2000 |
| JP | 2001045426 A * | 2/2001 |

\* cited by examiner

*Primary Examiner*—Lin Ye
(74) *Attorney, Agent, or Firm*—Sughrue Mion, PLLC

(57) ABSTRACT

Even if the digital camera is inexpensive without the function of reproducing images, it can effectively use a memory capacity and has the function of responding to quick image-capturing, and important images can be recorded with higher priority. The digital camera comprises a priority selection switch for selecting priority of an image, and information about selected priority is recorded in association with the image when the image is recorded. For example, priority is ranked on three stages of "important", "normal", and "memo". When a recording medium for storing image data has an insufficient memory capacity, control is exercised such that an image with priority lower than a newly captured image is automatically erased to record the new image. Further, a recorded image may be analyzed to automatically assign a low priority value to an image that may be damaged.

7 Claims, 7 Drawing Sheets

<AFTER SORTING>

| PRIORITY VALUE | FRAME NUMBER |
|---|---|
| 3 | 0001 |
| 3 | 0002 |
| ... | ... |
| 3 | x (NEWLY RECORDED IMAGE) |
| 2 | x+1 |
| 2 | x+2 |
| ... | ... |
| 1 | x+k+1 |
| 1 | x+k+2 |
| ... | ... |

<BEFORE SORTING>

| PRIORITY VALUE | FRAME NUMBER |
|---|---|
| 3 | 0001 |
| 3 | 0002 |
| ... | ... |
| 2 | x |
| 2 | x+1 |
| ... | ... |
| 1 | x+k |
| 1 | x+k+1 |
| ... | ... |

DIGITAL CAMERA WITH PRIORITY INFORMATION

BACKGROUND OF THE INVENTION

1. Field of the Invention

The present invention relates to a technique for recording and erasing an image that is applied to a digital camera.

2. Description of the Related Art

As disclosed in Japanese Patent Application Publication Nos. 2000-24479, 2000-125185, 11-187347, and 10-79914, most conventional digital cameras include an image display device such as a liquid crystal monitor. In such a camera with a monitor, when an unnecessary image is erased from images recorded in a recording medium such as a memory card, a user can select an image to be erased while viewing reproduced images on a monitor screen.

However, recently, while advanced digital cameras have been developed, inexpensive digital cameras have been put on the market with functions limited by omitting the function of reproducing images, to create a new commodity market. In general, such cameras not having the function of reproducing images have no device for erasing recorded images.

Further, as for the cameras having the function of reproducing images as well, when the user wants to quickly capture an image while an available capacity in a recording medium is insufficient, even if the user wants to erase images of lower priorities from recorded images, the user needs to confirm reproduced images on a monitor to find images to be erased. Thus, the operation is inconvenient and the user may miss an opportunity to capture an image.

SUMMARY OF THE INVENTION

The present invention has been developed in view of the above-mentioned circumstances, and has as its object the provision of a digital camera, by which even an inexpensive camera not having the function of reproducing images can effectively use a recording capacity, a camera having the function of reproducing images can respond to quick image-capturing, and important images can be recorded with higher priority.

In order to attain the above object, the present invention is directed to a digital camera capable of recording in a recording medium an image captured through an image pickup element, the digital camera comprising: a priority setting device which sets priority of a captured image; and a recording device which records information indicative of the priority set by the priority setting device in association with the captured image when the captured image is recorded.

According to the present invention, priority is set for each image recorded in the recording medium when image-capturing, and information indicative of priority is recorded with the image when the image is recorded. It is possible to readily extract an image with lower priority firstly as a candidate to be erased and to readily arrange images in order of priority by using priority information associated with an image.

In an embodiment of the present invention, the priority setting device is characterized by allowing the user to select priority. The user operates the priority setting device before image-capturing to optionally select priority of a captured image.

According to another embodiment of the present invention, the priority setting device is characterized by analyzing the captured image to determine whether the captured image is damaged or not and automatically setting lower priority than a normal image to an image that may be damaged.

It is hardly worth storing a damaged image (failed image) such as an image blurred by camera-shake and an image having an unsuitable amount of light exposure. Therefore, the captured image is analyzed, whether the captured image is damaged or not is determined, and information indicative of low priority is automatically assigned to the captured image that may be damaged. Thus, it is possible to readily discriminate a damaged image and a normal image by automatically setting priority. Of course, a camera may include the combination of a manual priority setting device, which allows the user to optically select priority, and an automatic priority setting device using image analysis.

As a pattern of use of the information indicative of priority associated with the image, the digital camera may further comprise a control device a control device which, if the recording medium has an insufficient recording capacity when a new image is captured, erases an image recorded in the recording medium with priority lower than the new image and records the new image in the recording medium.

Even when an available capacity is insufficient in the recording medium, by setting high priority before image-capturing, an image with lower priority is erased from recorded images, and a new image is recorded. Thus, it is possible to quickly respond to an opportunity for capturing an image and to effectively use a recording capacity of an inexpensive camera not having the function of reproducing images.

As another pattern of use of priority information, the digital camera may further comprise a frame number automatic correcting device which assigns frame numbers in order of priority by using the information indicative of the priority. Hence, it is possible to readily perform file management such as sorting files in order of priority. An important image can be firstly viewed and transferred.

The present invention is also directed to a digital camera capable of recording in a recording medium an image captured through an image pickup element, the digital camera comprising: a device which analyzes a captured image to determine whether the captured image is damaged or not and assigns identification information to a probably-damaged image; and a recording device which records the identification information in association with the captured image when the captured image is recorded.

As a pattern of use of the identification information, for example, control is exercised such that when the recording medium has an insufficient recording capacity, an image that may be damaged is erased and a newly captured image is recorded.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder preferred embodiments for a digital camera of the present invention will be described in accordance with the accompanied drawings.

Figure 1:
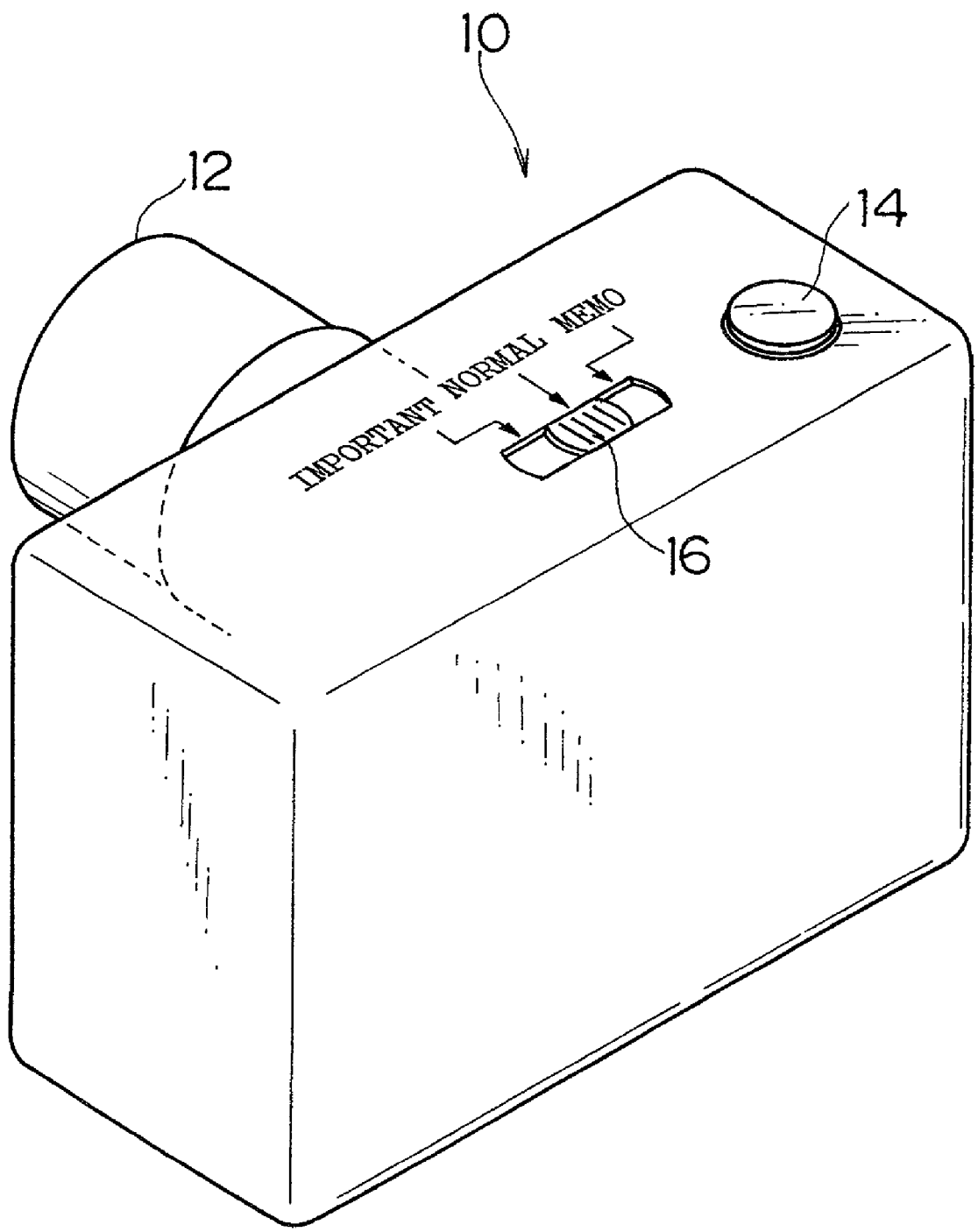
FIG. 1 is a perspective view showing a digital camera according to an embodiment of the present invention.

FIG. 1 is a perspective view showing a digital camera according to an embodiment of the present invention. The camera 10 includes a taking lens 12 and a shutter button 14, and further includes a switch for selecting priority of an image (hereinafter, referred to as priority selection switch) 16. The priority selection switch 16 has a sliding switch for specifying priority on three stages of "important", "normal", and "memo". A user can freely set a rank indicative of priority by operating the switch 16.

In normal image-capturing, priority is set at "normal" before image-capturing. When an image with lower priority is captured, "memo" is selected. When a particularly important image is captured, "important" is selected before image-capturing. In the present embodiment, priority is set on three stages. Priority may be ranked on two stages or more three stages.

Priority is added as information for identifying an image. The contents of image processing (the number of pixels, compressibility, and so on) are not affected by the order of priority. Moreover, the camera 10 does not have an image display device such as a liquid crystal monitor, so that the camera itself does not have the function of reproducing captured images.

Figure 2:
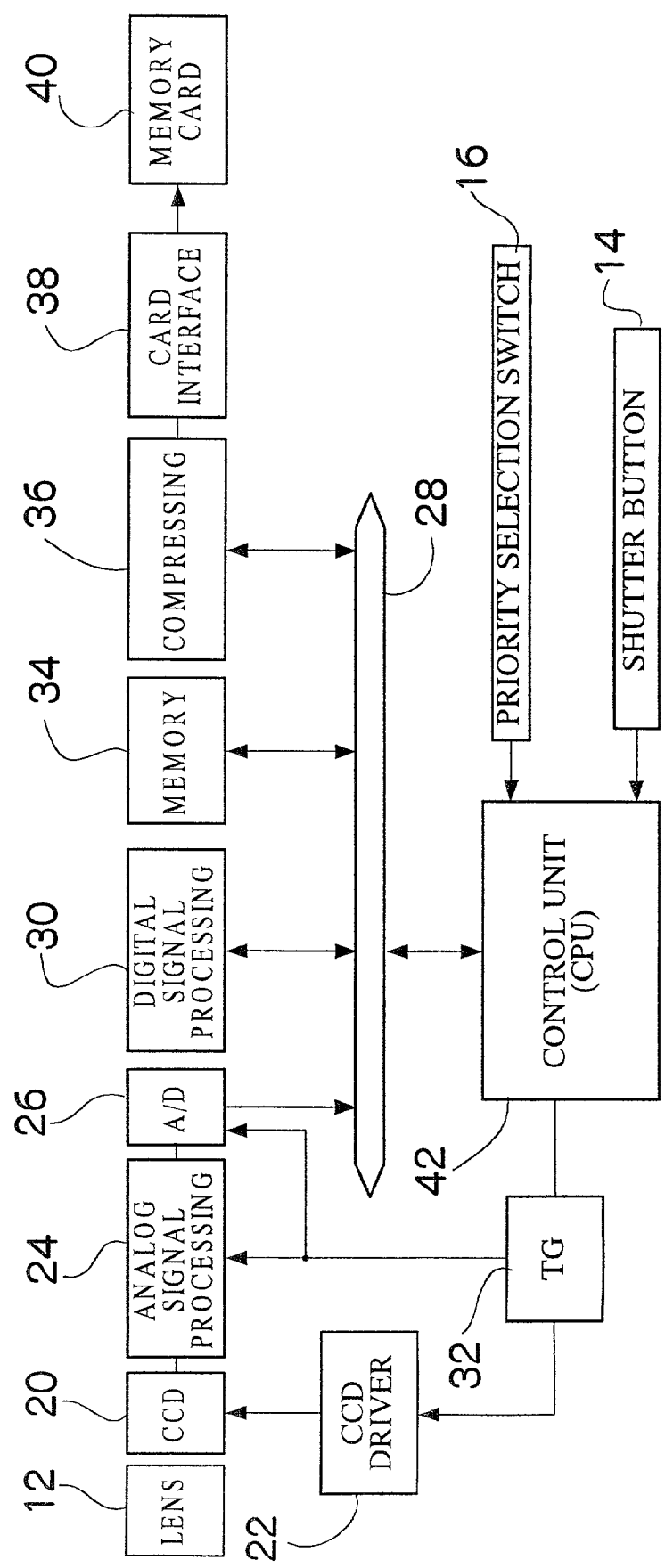
FIG. 2 is a block diagram showing the configuration of the digital camera of the present embodiment.

FIG. 2 is a block diagram showing the digital camera of the present embodiment. A CCD image sensor (hereinafter, referred to as a CCD) 20, which serves as an image pickup element, is provided at the rear of the taking lens 12. Photosensors are arranged horizontally on a light-receiving surface of the CCD 20. An image of a subject that is formed on the light-receiving surface of the CCD 20 through the taking lens 12 is converted by the photosensors to signal charge whose amount is determined by an incident light quantity. Additionally, the CCD 20 has a so-called electronic shutter function, which controls the charge storing time (shutter speed) of the photosensors according to the timing of a shutter gate pulse.

Signal charges stored in the photosensors are sequentially read as voltage signals (image signal) corresponding to signal charge based on a pulse supplied from a CCD driver 22, and the signals are transmitted to an analog signal processing section 24. The analog signal processing section 24 includes signal processing circuits such as a sampling hold circuit, a color separation circuit, and a gain adjustment circuit. In the analog signal processing section 24, correlation double sampling (CDS) is performed, color separation is performed to generate color signals of R, G, and B, and signal levels of the color signals are adjusted (pre-white balance).

Signals outputted from the analog signal processing section 24 are converted to digital signals in an A/D converter 26, and then, the signals are transmitted to a digital signal processing section 30 via a bus 28. Timing signals are supplied to the CCD driver 22, the analog signal processing section 24, and the A/D converter 26 from a timing generator (TG) 32. These timing signals synchronize the circuits.

The digital signal processing section 30 functions as an image processing device including a luminance/color-difference signal generating circuit, a gamma correction circuit, a sharpness correction circuit, a contrast correction circuit, and a white-balance correction circuit. Image data captured in response to the push of the shutter button 14 is converted to a luminance signal (Y signal) and a color-difference signal (CrCb signal) in the digital signal processing section 30, and the signals are subjected to a predetermined operation such as gamma correction. And then, the signals are stored in a memory 34. Data stored in the memory 34 is compressed in a predetermined form such as JPEG (Joint Photographic Experts Group) in a compressing section 36 and is recorded in a memory card 40 via a card interface 38.

In the camera 10 of the present embodiment, for example, smart media (Solid-State Floppy Disk Card) is used as a device for storing image data. The form of a recording medium is not limited to the above. A PC card, a compact flash, a magnetic disk, an optical disk, a magneto-optical disk, and a memory stick are also applicable. Various media are available which can read and write according to an electronic, magnetic, or optical method, or combined methods. A signal processing device and an interface that correspond to a used medium are used. Further, a device for storing images is not limited to a removable medium that can be attached and detached to the camera 10. A recording medium built in the camera 10 (internal memory) is also applicable. When images are stored in the internal memory, a communication interface is provided for transferring data to an external device such as a personal computer.

A control unit 42 is a block including a CPU and periphery circuits thereof, and has programs required for controlling the operation of the camera 10. In response to input signals received from the shutter button 14, the priority selection switch 16, and other operating sections, the control unit 42 controls the operation of the corresponding circuit and performs image-capturing control such as autofocus (AF) control, autoexposure (AE) control, and recording control.

Namely, the control unit 42 performs various computations such as focus evaluating computation and AE computation based on image data captured in response to a half push of the shutter button 14, and the control unit 42 controls a lens driving section (not shown) based on the computation result to shift the taking lens 12 to a focused position. Meanwhile, the control unit 42 controls a diaphragm mechanism (not shown) and the charge storing time of the CCD 20. Besides, the AF function may be omitted by using a taking optical system having a great depth of field. Further, the control unit 42 determines a recording capacity (memory capacity) of the memory card 40 and controls the recording operation.

Figure 3:
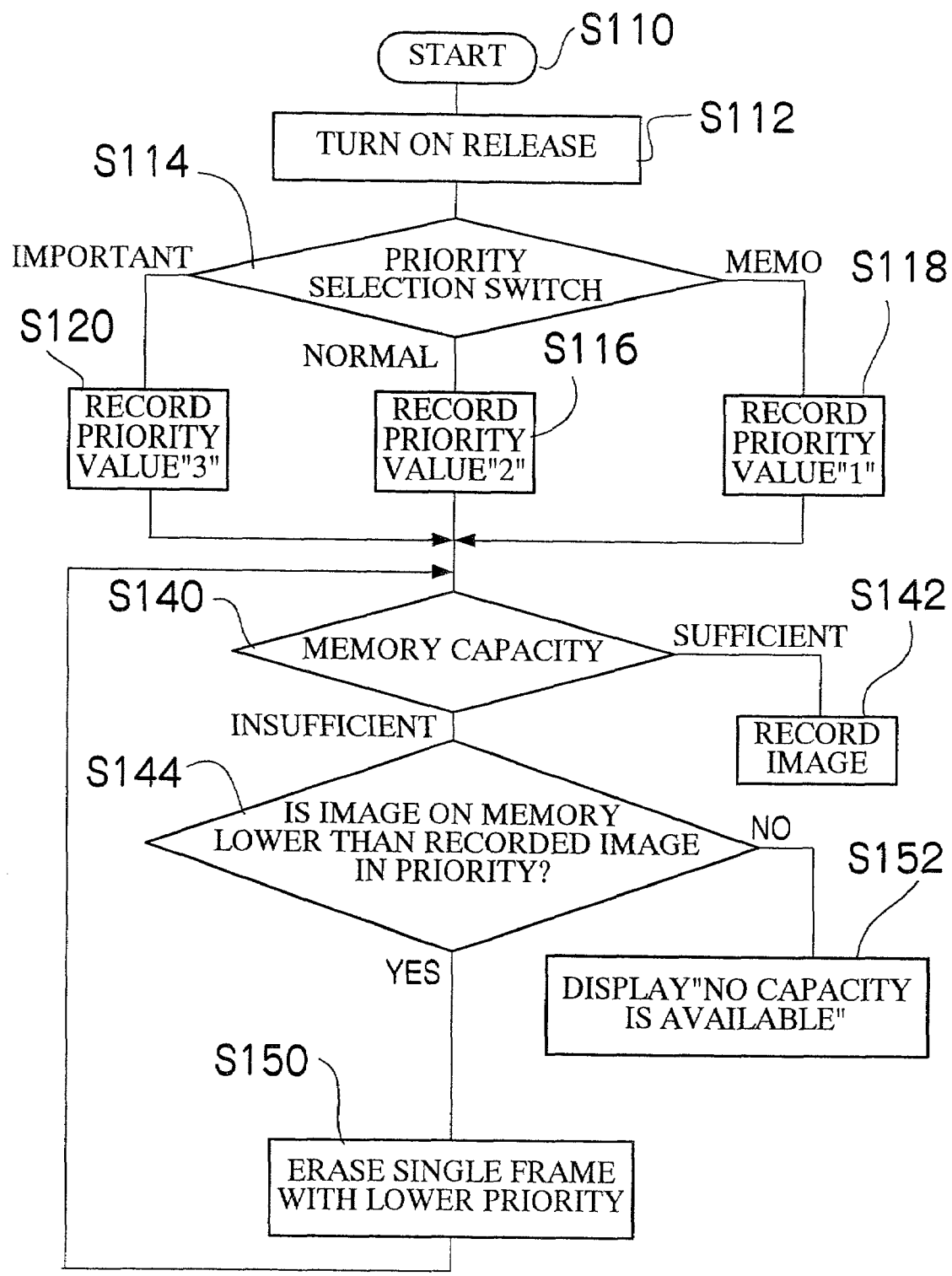
FIG. 3 is a flowchart showing the controlling steps of the digital camera according to the present embodiment.

The following will discuss the operation of the camera 10 configured thus. FIG. 3 is a flowchart showing the controlling steps of the camera 10. When the camera 10 is started (step S110) and a release signal is turned on at the push of the shutter button 14 (step S112), an image-capturing is started. Subsequently, the state of the priority selection switch 16 is determined (step S114).

When "normal" is selected by the priority selection switch 16, the flow proceeds to step S116, "2" is set as a value indicative of priority, and the value is associated with image data of the image-capturing. When "memo" is selected in step S114, the flow proceeds to step S118, "1" is set as a value indicative of priority, and the value is associated with image data of the image-capturing. When "important" is selected in step S114, the flow proceeds to step S120, "3" is set as a value indicative of priority, and the value is associated with image data of the image-capturing.

After step S116, step S118, or step S120, the flow proceeds to step S140. In step S140, a memory capacity of the memory card 40 is determined. When a sufficient memory capacity is available for recording a captured image, the image is recorded in the memory card 40 (step S142). At this moment, a value indicative of priority is recorded with the image.

When determination is made that a memory capacity is insufficient in step S140, the flow proceeds to step S144. In step S144, determination is made whether the memory card 40 stores an image with priority lower than a captured image (image to be recorded). When an image with priority "3" is captured while the memory card 40 stores at least an image with priority "2" or "1", or when an image with priority "2" or "3" is captured while the me card 40 stores only images with priority "1", determination is YES in step S144.

When YES determination is obtained in step S144, the flow proceeds to step S150, an image with lower priority is erased, and the flow returns to step S140. When a sufficient capacity is obtained for recording a new image by erasing an image in step S150, determination of "memory capacity available (OK)" is obtained in step S140, and the new image is recorded (step S142).

In step S150, when an image is erased but a sufficient capacity is not obtained for recording a new image, determination of "memory capacity shortage (NG)" is obtained in step S140, and another image is erased after determination of step S144.

In step S144, when an image to be erased does not exist and determination is NO, a new image cannot be recorded. Thus, the flow proceeds to step S152. In step S152, display is provided to notify that no capacity is available in the memory card 40 (or internal memory) and to recommend the user to exchange the card or transfer image data. As a device for displaying that no capacity is available, for example, an indicator lamp such as a light-emitting diode (LED) may be provided on the camera 10, a small liquid crystal indicator (character liquid crystal display) capable of displaying characters and symbols may be provided, or the indicators may be combined.

According to the camera 10 of the present embodiment, even in the case where no capacity is available in the memory card 40 while images with a priority value "1" or "2" are recorded in the memory card 40, since the shutter button 14 is pushed after "important" is selected by the priority selection switch 16, image data with priority "1" or "2" is automatically erased and a new image with priority "3" is recorded. When images of priority "1" and "2" are mixed in the card, an image with lower priority is erased first.

Since a recorded image is erased and a new image is recorded according to priority, even for the inexpensive camera 10 not having the reproducing function, it is possible to effectively use a remaining capacity of the memory card 40. Thus, the camera 10 can quickly respond to an opportunity for capturing an image.

Although the above explanation discussed the embodiment in which the user optionally specifies image priority, priority may be set automatically. Hereinafter, an embodiment of automatic priority setting will be discussed as another embodiment of the present invention.

Figure 4:
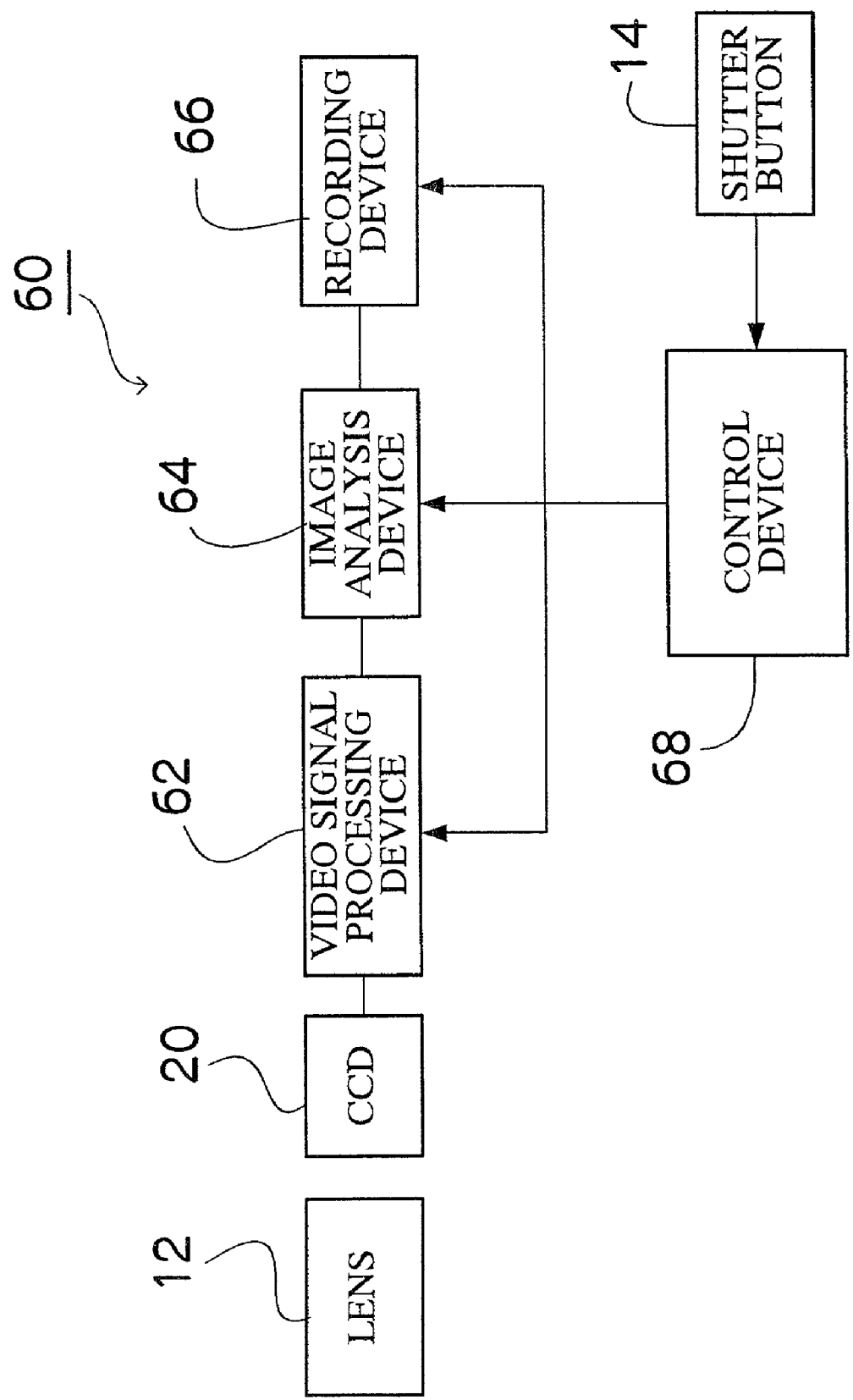
FIG. 4 is a block diagram showing a main configuration of a digital camera according to another embodiment of the present invention.

FIG. 4 is a block diagram showing a main configuration of a digital camera according to another embodiment of the present invention. The camera 60 is mainly composed of the taking lens 12, the CCD 20, a video signal processing device 62, an image analysis device 64, a recording device 66, a control device 68, and the shutter button 14. The video signal processing device 62 is a block for processing an image signal outputted from the CCD 20 to generate image data, and corresponds to a block including the analog signal processing section 24, the A/D converter 26, the digital signal processing section 30, and the memory 34 of FIG. 2. The image analysis device 64 of FIG. 4 is an image processing section for analyzing image data obtained in the video signal processing device 62, and is included in the digital signal processing section 30 of FIG. 2. The recording device 66 of FIG. 4 is a device for recording captured images with information (values) about priority, and corresponds to the compressing section 36, the card interface 38, and the memory card 40 of FIG. 2. Certainly, an internal memory may be used instead of a removable medium.

The camera 60 of FIG. 4 analyzes recorded images in the image analysis device 64 and determines whether the images are damaged or not. And then, regarding an image that may be damaged, a priority rank is automatically determined and a priority value is set according to the rank.

Figure 5:
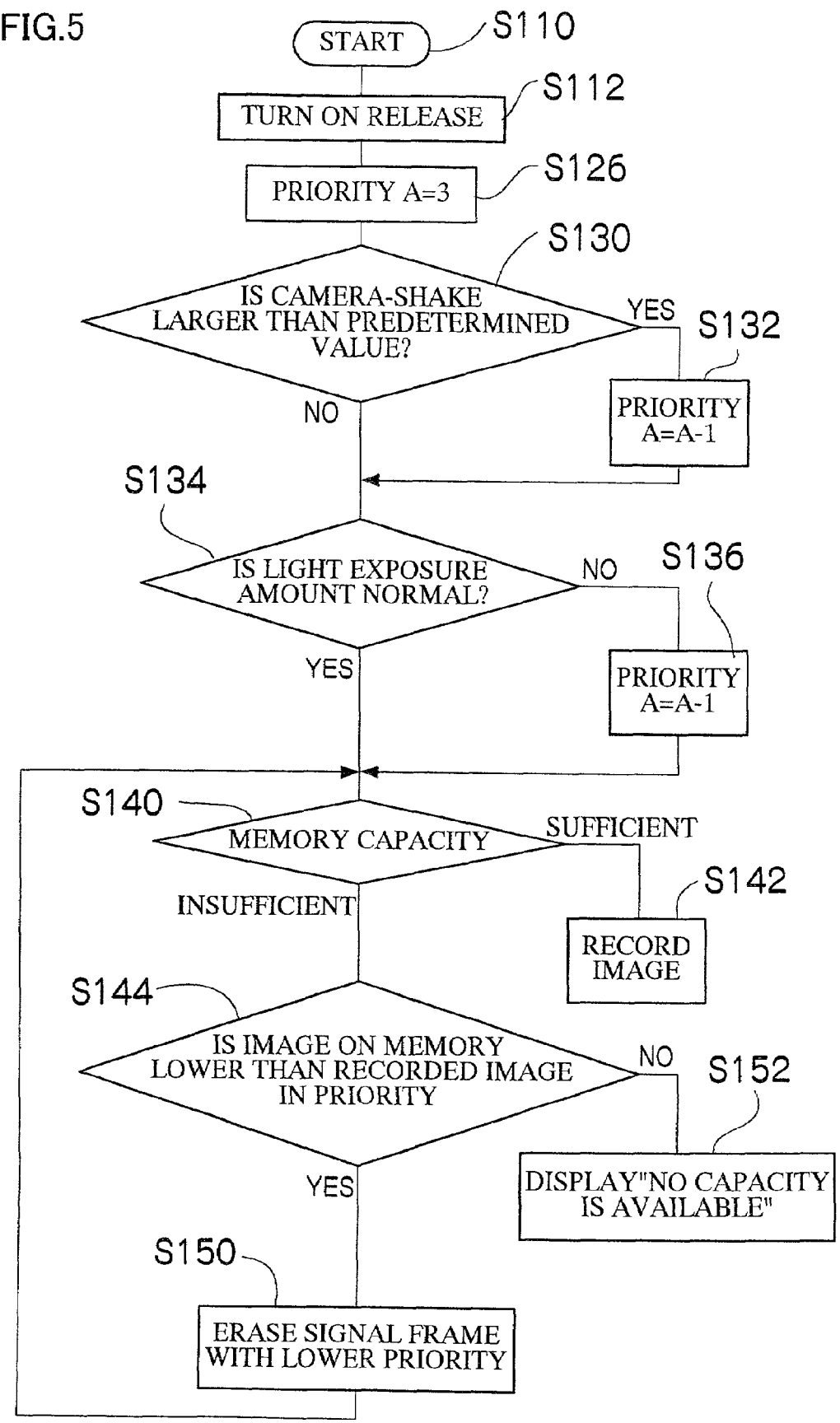
FIG. 5 is a flowchart showing the controlling steps of the digital camera shown in FIG. 4.

FIG. 5 is a flowchart showing the controlling steps of the camera 60. In FIG. 5, the steps shared by FIG. 3 are indicated by the same step numbers and the description thereof is omitted. To an image captured when the release button 14 is turned on (step S112), a priority value A=3 is initially assigned (step S126).

Subsequently, image analysis is performed on the image to determine whether a camera-shake is larger than a predetermined value (a predetermined determination reference value for determining shift) or not (step S130). A camera-shake is determined by detecting an edge of the image and determining whether the edge is shifted in one direction. In step S130, when determination is YES, the flow proceeds to step S132, 1 is subtracted from the priority value A, and the subtraction result is used as a new priority value A. After step S132 or when determination is NO in step S130, the flow proceeds to step S134.

In step S134, determination is made whether a quantity of light exposure is normal or not based on the image analysis. For example, luminance distribution of the entire screen is determined, and when a part having a luminance of 100% (a part where a gradation value indicating luminance is maximum, that is, a white void) or a part having a luminance close to 0% (a part where a gradation value indicating luminance is small and the part is viewed as black) makes up a predetermined ratio or more (e.g., 30% or more) on the entire screen, overexposure or underexposure is determined.

In step S134, when a quantity of light exposure is not normal (NO determination), the flow proceeds to step S136, 1 is subtracted from the priority value A, and the subtraction result is used as a new priority value A. After step S136, or when determination is made that a quantity of light exposure is normal in step S134, the flow proceeds to step S140. The operations after step S140 are the same as those of FIG. 3.

As shown in FIG. 5, a captured image is determined by image analysis and priority is automatically determined according to a level of the image that may be damaged. Thus, it is possible to firstly extract a failed image as an image to be erased. According to this embodiment, the priority selection switch 16 of FIG. 1 may be omitted, and it is also preferable to use the priority selection switch 16 in combination.

For example, according to a priority value selected in the priority selection switch 16, the result of image analysis is reflected to automatically correct the priority value. In this case, according to an embodiment, a priority value of an image captured after the priority selection switch 16 selects "important" is never corrected, so as to respect the intention of the user.

A method for automatically setting information indicative of priority by a camera is not limited to the above. The following method is also applicable: information about an image-capturing location is obtained using GPS (Global Positioning System), determination is automatically made whether the image-capturing location is an environment of daily life, and high priority is placed on an image captured in a location other than the environment of daily life.

The use of information indicative of priority is not limited to securing an available capacity obtained by automatically extracting an image to be erased. It is also possible to use priority information to arrange images (frames) in order of priority, thereby readily managing an image file after recording.

Normally, a digital camera automatically assigns consecutive frame numbers (file numbers) in order of image-capturing. The camera 10 according to an embodiment of the present invention can sort frames in order of priority using priority information to automatically change frame numbers. Besides, the frame numbers are used as file names. For example, a file name of "frame number=0001" is "DSCF0001.JPG", in which a prefix character string "DSCF" and an extension ".JPG" are added.

Figure 6:
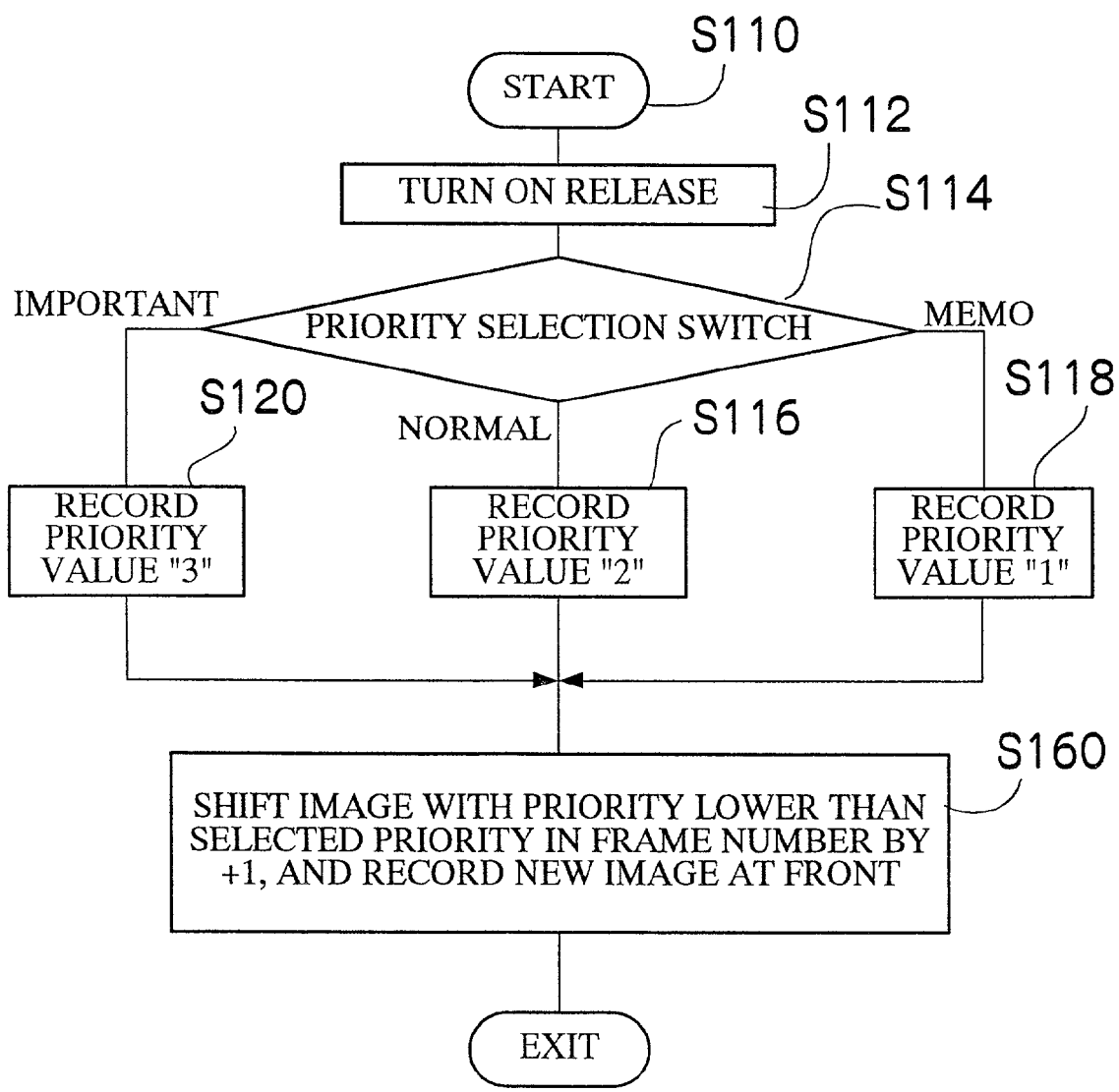
FIG. 6 is a flowchart showing the controlling steps of automatically rewriting frame numbers.

FIG. 6 is a flowchart showing the controlling steps. In FIG. 6, the steps shared by FIG. 3 are indicated by the same reference numerals and the description thereof is omitted. In FIG. 6, after the step of determining a priority value according to the setting of the priority selection switch 16 (step S116, step S118, or step S120), the flow proceeds to step S160. In step S160, images with priority lower than selected priority are shifted by +1 in frame number, and a new image is recorded at the front of the shifted images.

Figure 7:
FIG. 7 is an explanatory drawing showing the content of the operation of automatically rewriting frame numbers.

The above operation will be discussed using FIG. 7. The memory card 40 has already recorded a plurality of images with priority values of "3 (important)", "2 (normal)", and "1 (memo)". At this moment, when a new image with priority "3" is captured, images with priority lower than the above image, that is, images with priority 2 or less are shifted by +1 in frame number. An image with a frame number "x" is changed to an image with a frame number "x+1", and the subsequent frame number is also shifted by +1. And then, a frame number at the front ("x" in FIG. 7) that is made vacant by shifting the frame numbers by +1 is allocated to the newly recorded image.

The frame numbers are determined in order of priority according to the rule of step S160 shown in FIG. 6. Therefore, file management is readily performed when image data is transferred to an external device such as a personal computer, so that important data can be firstly transferred and important images can be firstly viewed. Further, after the step S134 or step S135 of FIG. 5, the operation of step S160 of FIG. 6 may be performed instead of the operations of the step S140 to step S152 (not shown).

Furthermore, it is also possible to combine the controlling methods of FIGS. 3 and 5 and the above-mentioned operation of rewriting frame numbers. In this case, in step S142 of FIGS. 3 and 5, the operation of step S160 in FIG. 6 is applied when an image is recorded.

Although the above description discussed the embodiment in which frame numbers are rewritten according to priority values, the range of use of frame numbers may be changed for each priority rank. For example, frame numbers "0001" to "0999" are assigned to "important" images, frame numbers "1001" to "1999" are assigned to "normal" images, and frame numbers "2001" to "2999" are assigned to "memo" images. Hence, priority can be recognized by a front digit of a frame number, and files can be sorted using ordinary application software, thereby readily managing files. Moreover, folders may be recorded respectively for priority ranks.

Although the above description discussed recording of still images, the present invention is not limited to this and is also applicable to record moving images.

The following will discuss variations of the above-mentioned embodiments.

(Variation 1) It is also preferable to add a device for editing priority information, which is determined by user selection using the priority selection switch 16 or automatic priority setting using image analysis, and which is recorded together with images. According to a camera with such an editing device, priority information, which has been recorded in image recording, can be freely changed by the user after recording.

(Variation 2) As discussed in FIG. 1, the present invention is quite effective when it is applied to a camera not having an image display device such as a liquid crystal monitor. However, the application of the present invention is not limited to the above and is also applicable to a camera having the function of reproducing images. In the case of a camera having the function of reproducing recorded images on an image display device (camera with a monitor), by assigning lower priority in advance to images to be erased, it is possible to respond to quick image-capturing and to prevent an important image from being erased by mistake. Further, according to the configuration additionally comprising a device for editing priority information, priority information can be readily changed by reexamining priorities of images while viewing reproduced images after image-capturing.

(Variation 3) In the above-mentioned embodiment, a priority rank is divided into three stages of "important">"normal">"memo". The classification is not limited to the above. For example, priority may be ranked on "work">"private" >"others (memo)", "portrait">"landscape">"others" based on a target (image-capturing mode), or "travel">"normal">"others". The number of priority ranks and the names of the ranks can be optionally changed.

As described above, according to the embodiment of the present invention, when an image is recorded, information indicative of priority of the image is recorded in association with the image. Thus, with priority information, control can be exercised to automatically erase an image with lower priority and arrange images in order of priority.

According to the embodiment of the present invention, a recorded image can be erased and a new image with higher priority can be recorded according to priority. Thus, it is possible to respond to quick image-capturing. A recording capacity can be effectively used by applying the present invention to an inexpensive camera not having the function of reproducing images.

Also, when the present invention is applied to a camera having the function of reproducing images, by assigning lower priority in advance to images to be erased, it is possible to respond to quick image-capturing and to prevent an important image from being erased by mistake.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital camera capable of recording in a recording medium an image captured through an image pickup element, the digital camera comprising:
   a priority setting device which sets priority of a captured image;
   a recording device which records information indicative of the priority set by the priority setting device in association with the captured image when the captured image is recorded; and
   a control device which, if the recording medium has an insufficient recording capacity when a new image is captured, erases an image recorded in the recording medium with priority lower than the new image and records the new image in the recording medium.

2. The digital camera according to claim 1, further comprising a frame number automatic correcting device which assigns frame numbers in order of priority by using the information indicative of the priority.

3. A digital camera capable of recording in a recording medium an image captured through an image pickup element, the digital camera comprising:
   a priority setting device which sets priority of a captured image, the priority setting device allowing a user to select priority;
   a recording device which records information indicative of the priority set by the priority setting device in association with the captured image when the captured image is recorded; and
   a control device which, if the recording medium has an insufficient recording capacity when a new image is captured, erases an image recorded in the recording medium with priority lower than the new image and records the new image in the recording medium.

4. The digital camera according to claim 3, further comprising a frame number automatic correcting device which assigns frame numbers in order of priority by using the information indicative of the priority.

5. A digital camera capable of recording in a recording medium an image captured through an image pickup element, the digital camera comprising:
   a priority setting device which sets priority of a captured image;
   a recording device which records information indicative of the priority set by the priority setting device in association with the captured image when the captured image is recorded; and
   a control device which, if the recording medium has an insufficient recording capacity when a new image is captured, erases an image recorded in the recording medium with priority lower than the new image and records the new image in the recording medium,
   wherein the priority setting device analyzes the captured image to determine whether the captured image is damaged or not and automatically sets lower priority than a normal image to a probably-damaged image.

6. The digital camera according to claim 5, further comprising a frame number automatic correcting device which assigns frame numbers in order of priority by using the information indicative of the priority.

7. A digital camera capable of recording in a recording medium an image captured through an image pickup element, the digital camera comprising:
   a device which analyzes a captured image to determine whether the captured image is damaged or not and assigns identification information to a probably-damaged image;
   a recording device which records the identification information in association with the captured image when the captured image is recorded; and
   a control device which, if the recording medium has an insufficient recording capacity when a new image is captured, erases an image recorded in the recording medium with the identification information and records the new image in the recording medium.

* * * * *